United States Patent
Schulze et al.

(10) Patent No.: US 7,225,288 B2
(45) Date of Patent: May 29, 2007

(54) EXTENDED HOST CONTROLLER TEST MODE SUPPORT FOR USE WITH FULL-SPEED USB DEVICES

(75) Inventors: Stefan Schulze, Gräfinau-Angstedt (DE); Siegfried Kay Hesse, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 653 days.

(21) Appl. No.: 10/324,782

(22) Filed: Dec. 20, 2002

(65) Prior Publication Data

US 2004/0078716 A1 Apr. 22, 2004

(30) Foreign Application Priority Data

Aug. 29, 2002 (DE) ................. 102 39 814

(51) Int. Cl.
*G06F 13/20* (2006.01)
*G06F 11/00* (2006.01)
*G01R 31/28* (2006.01)

(52) U.S. Cl. .................. 710/313; 714/43; 714/715
(58) Field of Classification Search ......... 710/313; 714/43, 715
See application file for complete search history.

(56) References Cited

U.S. PATENT DOCUMENTS

| | | | |
|---|---|---|---|
| 5,958,072 A * | 9/1999 | Jacobs et al. ............ 714/30 |
| 6,192,420 B1 * | 2/2001 | Tsai et al. ............... 710/10 |
| 6,393,588 B1 * | 5/2002 | Hsu et al. ............... 714/43 |
| 6,480,801 B2 * | 11/2002 | Chew ..................... 702/122 |
| 6,615,301 B1 * | 9/2003 | Lee et al. ................ 710/106 |
| 6,701,401 B1 * | 3/2004 | Lu et al. ................. 710/305 |
| 6,721,815 B1 * | 4/2004 | Leete ..................... 710/6 |
| 6,829,726 B1 * | 12/2004 | Korhonen .............. 714/25 |
| 2002/0124200 A1 * | 9/2002 | Govindaraman ...... 713/400 |
| 2003/0065839 A1 * | 4/2003 | Howard et al. ........ 710/100 |
| 2004/0072540 A1 * | 4/2004 | Wilson et al. ......... 455/41.2 |
| 2004/0225808 A1 * | 11/2004 | Govindaraman ...... 710/305 |
| 2005/0216650 A1 * | 9/2005 | Tjia et al. ............... 710/316 |

OTHER PUBLICATIONS

"Enhanced Host Controller Interface Specification for Universal Serial Bus, Revision 1.0", Intel Corporation, U.S. Mar. 12, 2002, http://www.intel.com/technology/usb/download/ehci-r10.pdf, pp. 7, 13, and 17.*

(Continued)

*Primary Examiner*—Mark H. Rinehart
*Assistant Examiner*—Faisal Zaman
(74) *Attorney, Agent, or Firm*—Meyertons Hood Kivlin Kowert & Goetzel, P.C.; B. Noël Kivlin

(57) ABSTRACT

An extended host controller test mode support is provided. In the example of USB host controllers, an enhanced host controller is provided to control the high-speed traffic. Further at least one companion host controller controls the full-speed and/or low-speed traffic. The enhanced host controller comprises a test circuit for controlling a USB transceiver macrocell to perform full-speed and/or low-speed test functions. The test functions may include a test-J function, a test-K function, a single-ended-zero test function, and the sending of test patterns.

9 Claims, 5 Drawing Sheets

OTHER PUBLICATIONS

"Universal Serial Bus Specification Revision 1.1", Compaq, Intel, Microsoft, NEC, Sep. 23, 1998, http://www.usb.org/developers/docs/usbspec.zip, pp. 123-124.*

"Universal Serial Bus Specification Revision 2.0", Compaq, Hewlett-Packard, Intel, Lucent, Microsoft, NEC, Philips, Sep. 23, 1998, http://www.usb.org/developers/docs/usb_20_02212005.zip, pp. 157 and 169-170.*

"Enhanced Host Controller Interface Specification for Universal Serial Bus, Revision 1.0", Intel Corporation, U.S., Mar. 12, 2002, http://www.intel.com/technology/usb/download/ehci-r10.pdf.

Lueker, et al, "USB 2.0 Transceiver Macrocell Interface (UTMI) Specification, Version 1.05", Intel Corporation, U.S., Mar. 29, 2001, http://www.intel.com/technolgy/usb/download/2_0_Xcvr_Macrocell_1_05.pdf.

Talarek, "USB 2.0 Transceiver and Macrocell Tester (T&MT) Interface Specification, Version 1.2", Intel Corporation, U.S., Apr. 1, 2001, http://www.intel.com/technolgy/usb/download/TransceiverandMacrocellTestV0_1_2.pdf.

* cited by examiner

EXTENDED HOST CONTROLLER TEST MODE SUPPORT FOR USE WITH FULL-SPEED USB DEVICES

BACKGROUND OF THE INVENTION

1. Field of the Invention

The invention generally relates to host controllers such as USB (Universal Serial Bus) host controllers and related methods, and in particular to test circuits and methods in such host controllers.

2. Description of the Related Art

USB was originally developed in 1995 to define an external expansion bus which facilitates the connection of additional peripherals to a computer system. The USB technique is implemented by PC (Personal Computer) host controller hardware and software and by peripheral friendly master-slave protocols and achieves robust connections and cable assemblies. USB systems are extendable through multi-port hubs.

In USB systems, the role of the system software is to provide a uniformed view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

Hubs are incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implemented in the USB 1.1 specification, this technique was still improved in order to provide a higher performance interface. FIG. 1 illustrates an example USB 2.0 system that comprises a host controller 100, a number of USB devices 115, 120, 125, 130, and two hubs 105, 110. In the system of FIG. 1, the hubs 105, 110 are introduced for increasing connectivity, but in other USB 2.0 systems, the USB devices can be connected directly to the host controller 100.

As mentioned above, USB 2.0 provides a higher performance interface, and the speed improvement may be up to a factor of 40. Moreover, as apparent from FIG. 1, USB 2.0 is backwards compatible with USB 1.1 because it allows for connecting USB 1.1 devices 120, 125, 130 to be driven by the same host controller 100. There may even be used USB 1.1 hubs 110.

As can be seen from FIG. 1, a USB 1.1 device 120 can be connected directly to a USB 2.0 hub 105. Moreover, it can also be connected directly to the host controller 100. This is made possible by the capability of USB 2.0 host controllers and hubs to negotiate higher as well as lower transmission speeds on a device-by-device basis.

Turning now to FIG. 2, the system software and hardware of a USB 2.0 system is illustrated. The system components can be organized hierachially by defining several layers as shown in the figure.

In the upper most layer, the client driver software 200 executes on the host PC and corresponds to a particular USB device 230. The client software is typically part of the operating system or provided with the device.

The USB driver 205 is a system software bus driver that abstracts the details of the particular host controller driver 210, 220 for a particular operating system. The host controller drivers 210, 220 provide a software layer between a specific hardware 215, 225, 230 and the USB driver 205 for providing a driver-hardware interface.

While the layers discussed so far are software implemented, the upper most hardware component layer includes the host controllers 215, 225. These controllers are connected to the USB device 230 that performs the end user function. Of course, for one given USB device, the device is connected to either one of the host controllers 215, 225 only.

As apparent from the figure, there is one host controller 225 which is an enhanced host controller (EHC) for the high speed USB 2.0 functionality. This host controller operates in compliance with the EHCI (Enhanced Host Controller Interface) specification for USB 2.0. On the software side, host controller 225 has a specific host controller driver (EHCD) 220 associated.

Further, there are host controllers 215 for full and low speed operations. The UHCI (Universal Host Controller Interface) or OHCI (Open Host Controller Interface) are the two industry standards applied in the universal or open host controllers (UHC/OHC) 215 for providing USB 1.1 host controller interfaces. The host controllers 215 have assigned universal/open host controller drivers (UHCD/OHCD) 210 in the lowest software level.

Thus, the USB 2.0 compliant host controller system comprises driver software and host controller hardware which must be compliant to the EHCI specification. While this specification defines the register-level interface and associated memory-resident data structures, it does not define nor describe the hardware architecture required to build a compliant host controller.

Referring now to FIG. 3, the hardware components of a common motherboard layout are depicted. The basic elements found on a motherboard may include the CPU (Central Processing Unit) 300, a northbridge 305, a southbridge 310, and system memory 315. The northbridge 305 usually is a single chip in a core-logic chipset that connects the processor 300 to the system memory 315 and the AGP (Accelerated Graphic Port) and PCI (Peripheral Component Interface) buses. The PCI bus is commonly used in personal computers for providing a data path between the processor and peripheral devices like video cards, sound cards, network interface cards and modems. The AGP bus is a high-speed graphic expansion bus that directly connects the display adapter and system memory 315. AGP operates independently of the PCI bus. It is to be noted that other motherboard layouts exist that have no northbridge in it, or that have a northbridge without AGP or PCI options.

The southbridge 310 is usually the chip in a system core-logic chipset that controls the IDE (Integrated Drive Electronics) or EIDE (Enhanced IDE) bus, the USB bus, that provides plug-and-play support, controls a PCI-ISA (Industry Standard Architecture) bridge, manages the keyboard/ mouse controller, provides power management features, and controls other peripherals.

USB host controllers and other host controllers in southbridges or I/O hubs are hardware components that are extremely complex in structure. Thus, there may occur faults in the operation of such host controllers, and it is usually difficult to resolve whether such faults are caused by hardware components or by the software driver or any other hardware or software components.

For this reason, host controllers, hubs, and other functions usually have some testing mechanisms that may allow for performing static or dynamic electrical tests. Such mechanisms are however difficult to implement and the tests hard to accomplish. For instance, USB 1.1 compliant controllers need a special software setup to stimulate a physical device in a way that it can be electrically characterized. With USB 2.0 compliant host controllers, several test modes are supported to facilitate compliance testing. However, these test modes solely relate to the USB 2.0 high-speed data traffic.

It has therefore been found to be disadvantageous in the prior art systems, in particular in USB systems, that many different test mechanisms need to be provided in many cases, and each of the diagnostic functions has to comply with its own implementation rules. Specifically in USB 2.0 enhanced host controllers, testing of full and low speed data transfers is still subject to the restrictions and disadvantages of USB 1.1 compliant techniques.

SUMMARY OF THE INVENTION

An improved test mechanism for serial bus host controllers is provided that may on the one hand simplify the test procedure and on the other hand extend the available test modes to increase the reliability of the overall operation of hardware and software.

In one embodiment, a USB host controller is provided that comprises an enhanced host controller that is adapted to control a USB high-speed data traffic. Further, the USB host controller comprises at least one companion host controller that is adapted to control a USB full-speed and/or low-speed data traffic, and a USB transceiver macrocell that is connected to the enhanced host controller to handle the data transfer to and from a USB device. The enhanced host controller comprises a test circuit for controlling the USB transceiver macrocell to perform full-speed and/or low-speed test functions.

In another embodiment, there is provided a southbridge device having USB functionality. The southbridge device comprises a USB enhanced host controller that is adapted to control a high-speed data traffic, and a USB transceiver macrocell that is connected to the USB enhanced host controller to handle the data transfer to and from a USB device. The southbridge device further comprises a transceiver test circuit for controlling the transceiver macrocell to perform full-speed and/or low-speed test functions.

In yet another embodiment, a host controller may be provided for controlling the transfer of data to and from peripheral devices over a serial bus. The host controller comprises a first control circuit adapted to control a data transfer at a first data transmission speed, and a second control circuit adapted to control a data transfer at a second data transmission speed lower than the first data transmission speed. The host controller further comprises a transceiver circuit that is connected to the first control circuit to handle the data transfer to and from the peripheral devices at the first and second data transmission speeds. The first control circuit comprises a test circuit for controlling the transceiver circuit to perform test functions to test the operation of the transceiver circuit at the second data transmission speed.

In still another embodiment, a computer system comprises at least one USB device and a southbridge device. The southbridge device comprises a USB enhanced host controller that is adapted to control a high-speed data traffic, and a USB transceiver macrocell that is connected to the USB enhanced host controller to handle the data transfer to and from the at least one USB device. The southbridge device further comprises a transceiver test circuit for controlling the USB transceiver macrocell to perform full-speed and/or low-speed test functions.

In still another embodiment, there may be provided a method of operating a USB host controller. The method comprises operating an enhanced host controller to control a USB high-speed data traffic, and operating at least one companion host controller to control a USB full-speed and/or low-speed data traffic. The method further comprises handling the data transfer to and from a USB device in a USB transceiver macrocell. Moreover, the method comprises operating a test circuit in the enhanced host controller to control the USB transceiver macrocell to perform full-speed and/or low-speed test functions.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Before discussing in detail the extended host controller test mode support according to the embodiments, an example construction is given of how a host controller according to an embodiment can be arranged in general. While the following embodiments relate to the USB technique it is noted that other embodiments are possible where the transfer of data to and from peripheral devices is controlled over a non-USB serial bus.

Figure 1:
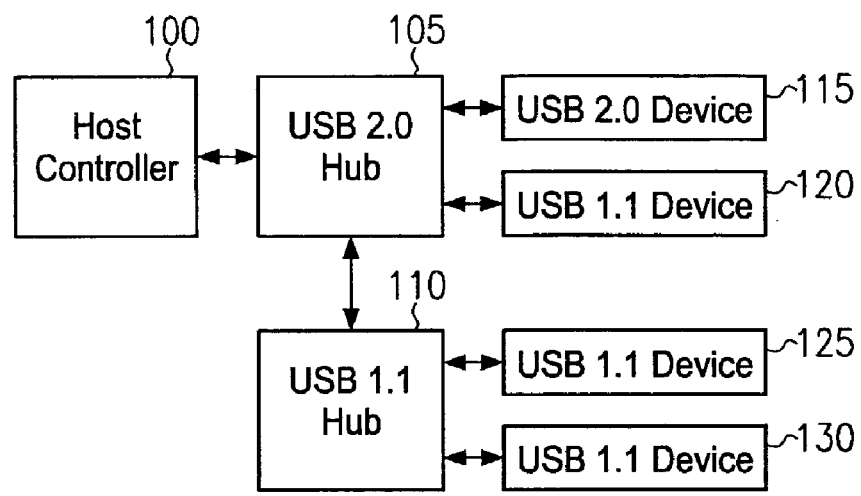
FIG. 1 illustrates an example USB 2.0 compliant system.
Figure 2:
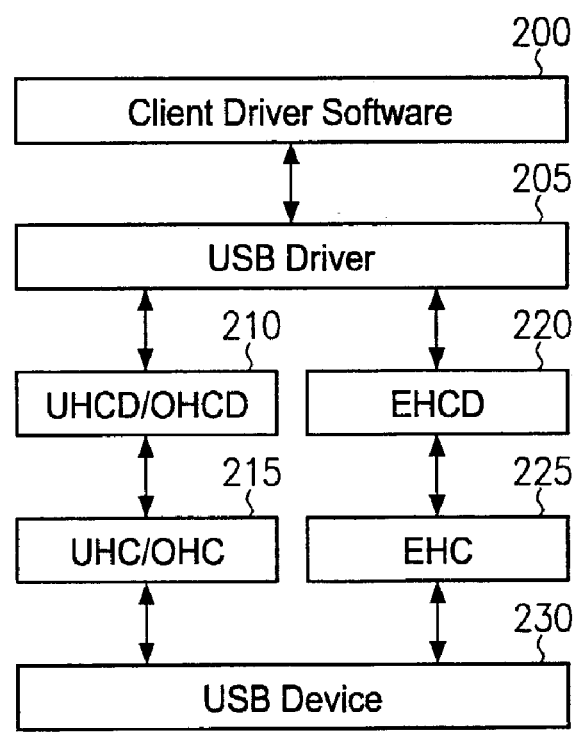
FIG. 2 illustrates the hardware and software component layers in the system of FIG. 1.
Figure 3:
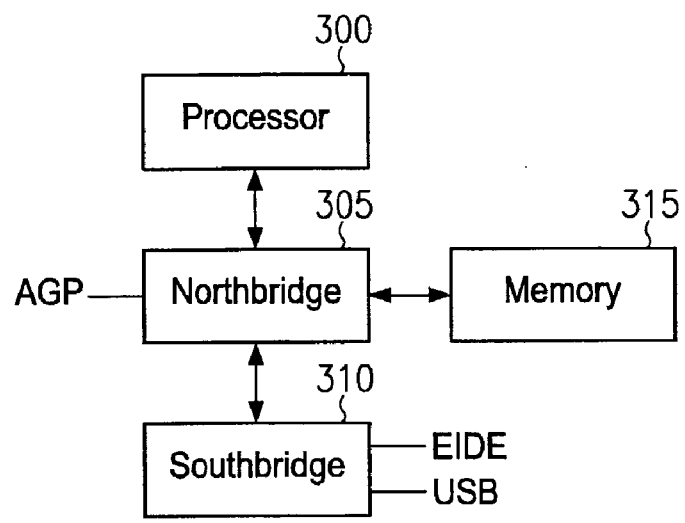
FIG. 3 illustrates a common motherboard layout.
Figure 4:
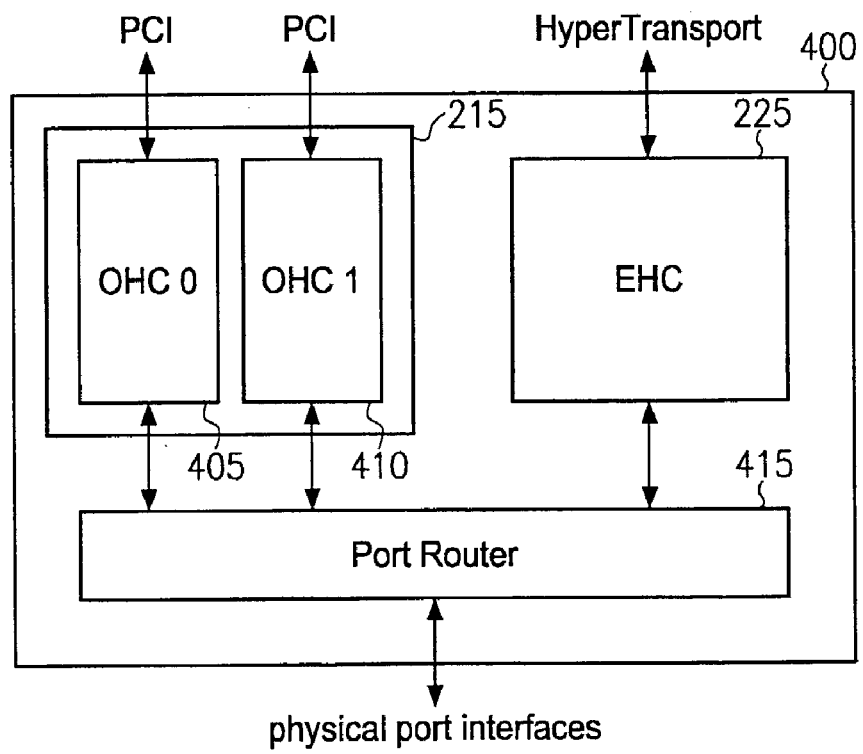
FIG. 4 illustrates the main components of the USB 2.0 compliant host controller according to an embodiment.

Referring now to the drawings and particularly to FIG. 4, the main components of a USB 2.0 compliant host controller 400 according to an embodiment are shown. In general, the host controller comprises three main components: the enhanced host controller (EHC) 225, one or more companion host controllers 215, and the port router 415.

The enhanced host controller 225 handles the USB 2.0 high speed traffic. Additionally, it controls the port router 415.

In the companion host controller unit 215 of the present embodiment, there are two OHCI compliant host controllers, OHC0 405 and OHC1 410. These controllers handle all USB 1.1 compliant traffic and may contain the legacy keyboard emulation for non-USB aware environments.

The port router 415 assigns the physical port interfaces their respective owners. This ownership is controlled by EHC registers, and per default all ports are routed to the companion host controllers in order to allow for a system with only USB 1.1 aware drivers to function. If a USB 2.0 aware driver is present in the system it will assign the ports to either a companion host controller 405, 410 for low and full speed devices and hubs (USB 1.1 traffic) or to the EHC 225 for high speed devices and hubs.

That is, the USB 2.0 host controller shown in FIG. 4 complies with the EHCI specification and allows for using existing OHCI USB 1.1 host controllers with the minimum alteration necessary to interface to the port router block 415, instead of USB 1.1 driver cell.

Plug-and-play configuration may be handled separately by each host controller 405, 410, 225. There may be an EHCI-imposed restriction that the OHCI controllers 215 must have lower function numbers than the EHCI controller 225.

The USB 2.0 compliant host controller of FIG. 4 may be defined as hardware architecture to implement an EHCI-compliant host controller for integration into a southbridge 310. The host controller then resides between the USB-2 analog input/output pins and a link interface module for interfacing upstream towards system memory, e.g. interfacing to a northbridge if there is one present in the system. This interface may be an internal HyperTransport™ interface. The HyperTransport technology is a high speed, high performance point-to-point link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy PC buses, to be extensible to new system network architecture buses, to be transparent to operating systems, and to offer little impact on peripheral drivers.

Thus, in the embodiment of FIG. 4 a HyperTransport-based USB host controller is provided where an enhanced host controller 225 is responsible for handling all high speed USB traffic as well as controlling port ownership for itself and the companion controllers 215 via the port router 415. After power-on reset or software-controlled reset of the EHC 225, it may default to a state where all ports are owned and controlled by the companion host controllers 215, all operational registers are at their respective default values, and the EHC 225 is halted, i.e. it neither fetches descriptors from system memory 315 nor issues any USB activity. In normal operation, the EHC 225 may process isochronous and interrupt transfers from a periodic list, bulk and control from an asynchronous list. Either list can be empty or its processing disabled by software.

Figure 5:
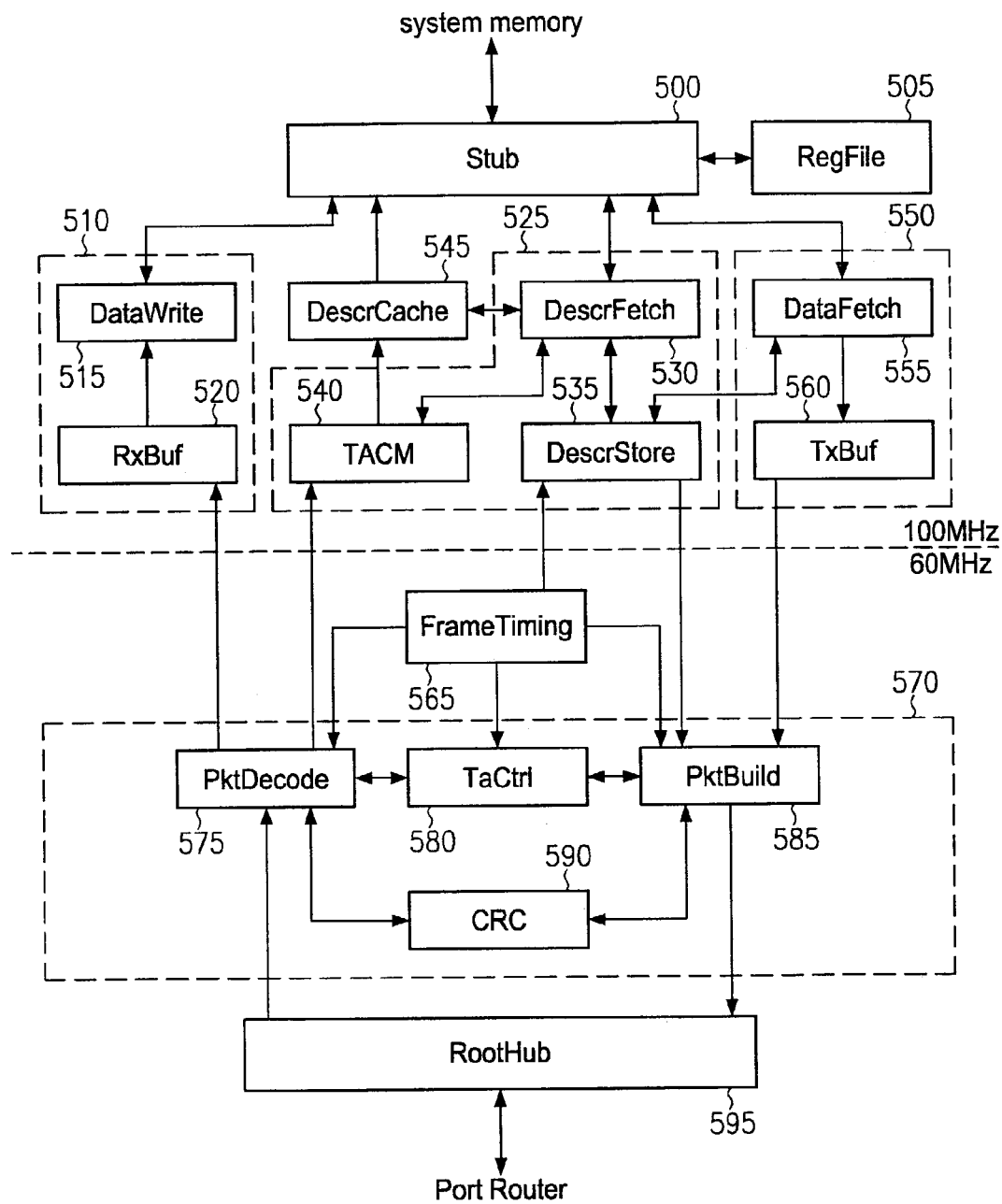
FIG. 5 is a block diagram illustrating the components of the enhanced host controller that is a component of the arrangement of FIG. 4.

Turning now to FIG. 5, the components of the enhanced host controller EHC 225 are depicted in more detail. As can be seen from the figure, the enhanced host controller 225 can be divided into a 100 MHz core clock domain and a 60 MHz clock domain. While the 60 MHz clock domain includes the circuitry for routing transactions to physical devices, the 100 MHz clock domain does the actual descriptor processing. It is to be noted that in other embodiments, the domains may have clock rates different from the above values of 100 MHz and 60 MHz. In these embodiments, the descriptor processing domain clock still has a frequency at least as high as the other domain, or higher.

In the 100 MHz domain, handling of the data traffic to and from the system memory is done by the stub 500. The stub 500 assigns the internal sources and sinks to respective HyperTransport streams, i.e. posted requests, non-posted requests, responses. The stub 500 arbitrates the internal HyperTransport interface between all internal bus masters, i.e. the receive DMA (Direct Memory Access) engine 510, the descriptor cache 545, the descriptor processing unit 525 and the transmit DMA engine 550. Thus, the stub 500 arbitrates between descriptor fetching, writing descriptors back, receiving and transmitting data.

The stub 500 is connected to a register file 505 that contains the EHCI registers. In the present embodiment, the EHCI registers store data with respect to the PCI configuration, the host controller capabilities and the host controller operational modes.

The descriptor processing unit 525 is connected to stub 500 and comprises three subunits: the descriptor fetching unit (DescrFetch) 530, the descriptor storage unit (DescrStore) 535 and the transaction completion machine (TACM) 540. The descriptor fetching unit 530 determines, based on timing information and register settings, which descriptor is to be fetched or prefetched next and sends the request to the stub 500 and/or to the descriptor cache 545. When it receives the descriptor it sends it to the descriptor storage unit 535.

The descriptor storage unit 535 holds the prefetched descriptors. By performing storage management, its main function is to provide a storage capacity to average memory access legacies for descriptor fetches.

The transaction completion machine 540 is connected to the descriptor fetching unit 530 for managing the status write-back to descriptors. For this purpose, the transaction completion machine 540 is connected to the descriptor cache 545.

This cache holds descriptors which have been prefetched by the descriptor fetching unit 530 for fast re-access. The descriptors held in the descriptor cache 545 are updated by the transaction completion machine 540 and eventually written back to system memory, via stub 500. The descriptor cache 545 may be fully associative with write-through characteristics. It may further control the replacement of the contents dependent on the age of the stored descriptors.

As apparent from FIG. 5, there are further provided the transmit DMA engine 550 and the receive DMA engine 510. The transmit DMA engine 550 comprises a data fetching unit (DataFetch) 555 and a data transmit buffer (TxBuf) 560. The data fetching unit 555 is the DMA read bus master and inspects the entries in the descriptor storage unit 535 of the descriptor processing unit 525. The data fetching unit 555 prefetches the corresponding data and forwards it to the data transmit buffer 560.

The data transmit buffer 560 may be a FIFO (first in first out) buffer, and its function corresponds to that of the descriptor storage unit 535 in that it allows to prefetch enough data for outgoing transactions to cover the memory system latency. The data transmit buffer 560 may further serve as clock domain translator for handling the different clocks of the domains.

The receive DMA engine 510 comprises the data writing unit (DataWrite) 515 which serves as DMA write bus master unit for moving the received data that are stored in the data receive buffer (RxBuf) 520, to its respective place in system memory. The data receive buffer 520 may be a simple FIFO buffer and may also serve as clock domain translator.

In the 60 MHz clock domain, there is provided a frame timing unit (FrameTiming) 565 that is the master USB time reference. One clock tick of the frame timing unit corresponds to an integer (e.g. 8 or 16) multiple of USB high speed bit times. The frame timing unit 565 is connected to the descriptor storage unit 535 and to the packet handler block 570.

The packet handler block 570 comprises a packet building unit (PktBuild) 585 that constructs the necessary USB bus operations to transmit data and handshakes, and a packet decoder (PktDecode) 575 that disassembles received USB packets. Further, a transaction controller (TaCtrl) 580 is provided that supervises the packet building unit 585 and the packet decoder 575. Further, the packet handler 570 comprises a CRC (cyclic redundancy check) unit 590 for generating and checking CRC data for transmitted and received data.

The packet building unit 585 and the packet decoder 575 of the packet handler 570 are connected to the root hub 595 that comprises port specific control registers, connect detection logic and scatter/gather functionality for packets between the packet handler 570 and the port router.

While the description above was provided to describe in more detail the data processing in a USB host controller according to an embodiment, the extended host controller test mode support according to the embodiments will now be described with reference to FIGS. 6 and 7.

Figure 6:
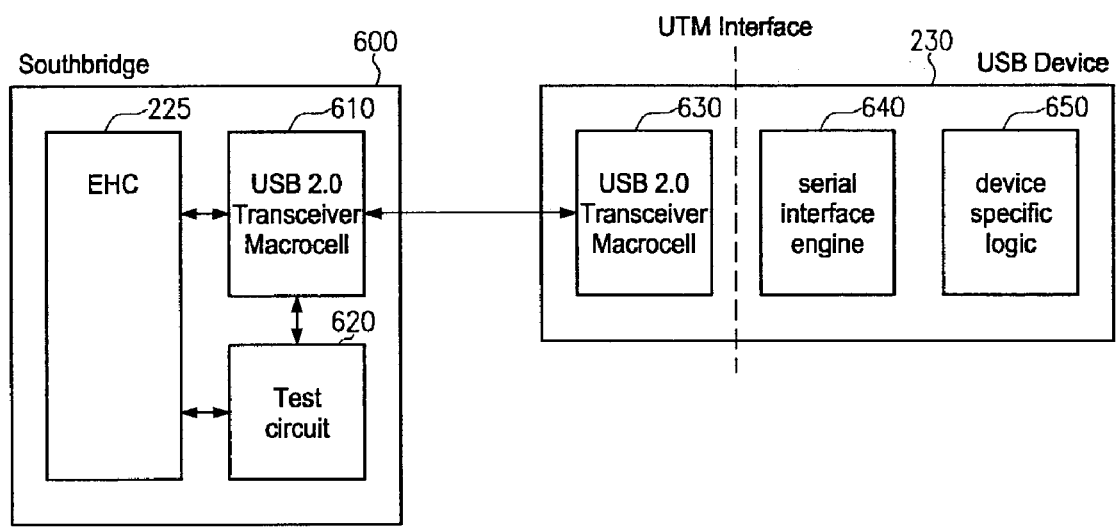
FIG. 6 schematically illustrates the interconnection of a southbridge device according to an embodiment, and a USB device.

FIG. 6 illustrates the interconnection between a southbridge device 600 according to an embodiment, and a USB device 230. Both, the southbridge 600 and the USB device 230 comprise a USB transceiver macrocell (UTM) 610, 630. These blocks handle the low level USB protocol and signalling, including features such as data serialization and de-serialization, bit stuffing, and clock recovery and synchronisation.

In the embodiment of FIG. 6, the USB device 230 is shown to be a USB 2.0 device. It is however to be noted that in another embodiment, the southbridge 600 can be connected to a USB 1.1 device. In this case, a USB 2.0 transceiver macrocell 610 is only provided within the southbridge 600.

Turning now back to the embodiment of FIG. 6, the USB 2.0 transceiver macrocells 610, 630 support all of the serial data transmission rates specified in the USB 2.0 specification: the high speed rate of 480 Mbit/s, the full speed rate of 12 Mbit/s, and the low speed rate of 1.5 Mbit/s. In the USB device 230, the USB 2.0 transceiver macrocell 630 has a UTM interface to the serial interface engine 640 which is connected to the device specific logic 650 for connecting to the device hardware.

In the southbridge 600, there are provided the transceiver macrocell 610 and the enhanced host controller 225. In addition, there is provided a test circuit 620 that is interconnected to the transceiver macrocell 610. While the test circuit 620 is shown in FIG. 6 to be separate from the enhanced host controller 225, it is to be noted that the test circuit 620 may also be comprised in the enhanced host controller 225. In this case, a test circuit 620 in the enhanced host controller 225 is provided to control the transceiver macrocell 610 of the southbridge 600 to perform full-speed and/or low-speed test functions.

Before going into the details of these test functions, it is to be mentioned that the transceiver macrocells 610, 630 are capable of handling an NRZI (Non Return to Zero Invert) data transfer. NRZI is a method of encoding serial data in which ones and zeros are represented by opposite and alternating high and low voltages (which are referred to as K or J states in the following) where there is no return to zero voltage between encoded bits. This technique keeps the sending and receiving clocks synchronized and is especially helpful in situations where bit stuffing is employed.

As already mentioned earlier, USB 2.0 compliant host controllers support several test modes to facilitate compliance testing in the high-speed data traffic. This test mode support is described in section 7.1.20 of the USB 2.0 specification. In the embodiments, this technique will now also be applied to full-speed and/or low-speed data transfers.

In detail, the test circuit 620 which may be comprised in the enhanced host controller 600, controls the USB transceiver macrocell 610 to perform full-speed and/or low-speed test functions. One of these test functions is a test-J function that forces the transceiver macrocell 610 to enter the J state and remain in that state until an exit action is taken. Another test function is the test-K function that forces the transceiver macrocell 610 to enter the K state and remain in that state until an exit action is taken. The test-J and test-K functions enable the testing of the high output drive levels even in the full and low speed modes.

Another full-speed and low-speed test function is the single-ended-zero (SE0) function that forces the USB transceiver macrocell 610 to enter a full-speed or low-speed receive mode and remain in that mode until an exit action is taken. This enables the testing of the output impedance, low level output voltage, and loading characteristics, and further provides a general purpose stimulus/response test for basic functional testing.

There may be another test function for testing the full-speed and/or low-speed operation of the transceiver macrocell 610, by using test packets. Using a test packet forces the transceiver macrocell 610 to repetitively transmit a full or low speed test pattern until an exit action is taken. This test function may enable the testing of rise and fall times, eye patterns, jitter, and any other dynamic waveform specifications. An example of using a test function employing a test packet is depicted in FIG. 7.

Figure 7:
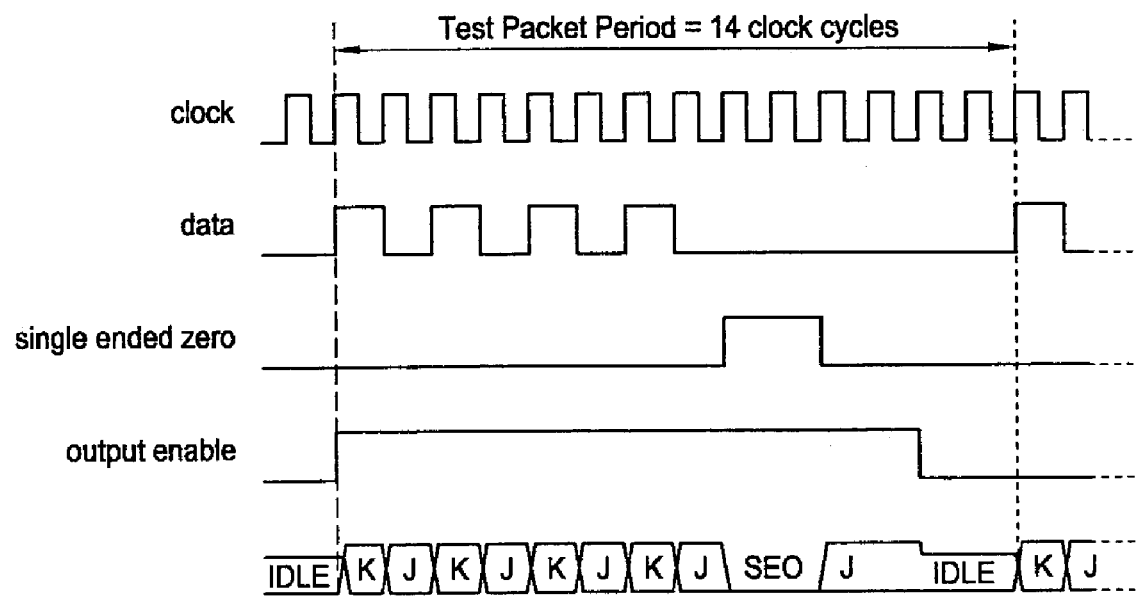
FIG. 7 is a timing chart illustrating a low speed mode example of a test packet according to an embodiment.

FIG. 7 illustrates a low speed mode example where the data signal line and the single ended zero signal line are set to transmit a test pattern that is a concatenation of four KJ state pairs, two single-ended-zero signals, and two J states. When taking into account the idle period at the end of the test packet period, 14 clock cycles are needed to transmit the test pattern.

It is to be noted that in other embodiments, test patterns may be used that differ in the sequence of K states, J states, and single-ended-zero signals, compared with the sequence in the test pattern of FIG. 7. Moreover, the lengths of the test patterns may even deviate from the value of 14 clock cycles.

Given the above discussed full-speed and/or low-speed test functions, the host controller device according to the embodiments extend the existing test and debug features to allow an exhaustive test of the USB transceiver macrocell 610.

To control and perform these test mode support extensions, additional registers may be provided. As already mentioned above, the register file 505 stores data with respect to the host controller capabilities and operational modes. Above these EHC registers, the following additional registers may be provided in the register file 505: a control register, a status register, and a vendor command control register.

The control register stores data indicating one of the full-speed and low-speed test functions. Further, the control register stores a flag indicating whether the indicated test function is currently to be performed.

The status register stores data indicating a status when the USB transceiver macrocell 610 is controlled to perform one of the full or low speed test functions. Moreover, the status register may store a flag that indicates the occurrence of a data transmission error. The status register may further store additional information concerning line states and connection states and other related information.

The vendor command control register allows direct access to the vendor command ports of the USB transceiver macrocell 610. The register may store a vendor control command or an indication thereof, and may further store a flag indicating that the vendor control command is to be loaded. If the load is completed, the bit may be automatically cleared by hardware. Software can then read the register to get all needed status information.

As already mentioned before, the test modes supported by to the embodiments extend test techniques which were already available for testing of high-speed traffic, to full-speed and low-speed transfer modes. This may be done by providing a test circuit in the enhanced host controller, i.e. in that unit that controls the high-speed data traffic. The test circuit in the enhanced host controller controls the USB transceiver macrocell 610 to perform full-speed and/or low-speed test functions.

While the above embodiments were directed to USB 2.0 compliant host controllers, it is to be noted that other embodiments may relate to non-USB host controllers. Such host controllers control the data transfer to and from peripheral devices over a serial bus. There may be a first control circuit for controlling the data transfer at a first speed, and a second control circuit for controlling the transfer at a second speed that is lower than the first speed. The first control circuit comprises a test circuit for controlling a transceiver circuit to perform test functions relating to the second speed.

In further embodiments, southbridge devices may be provided that have built-in circuitry for providing the extended test mode support described above.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A USB (Universal Serial Bus) host controller comprising:
   an enhanced host controller adapted to control a USB high-speed data traffic;
   at least one companion host controller adapted to control a USB full-speed and/or low-speed data traffic; and
   a USB transceiver macrocell connected to said enhanced host controller to handle the data transfer to and from a USB device;
   wherein the enhanced host controller comprises a register file, the register file including first registers adapted to store data with respect to host controller capabilities and operational modes and second registers adapted to store data with respect to at least one of said full-speed and/or low-speed test functions, wherein at least one of said second registers is a control register storing data indicating one of said full-speed and/or low-speed test functions, wherein said control register is adapted to store a flag indicating whether said one of said full-speed and/or low-speed test functions is currently being performed;
   wherein said enhanced host controller comprises a test circuit for controlling said USB transceiver macrocell to perform full-speed and/or low-speed test functions;
   wherein said USB transceiver macrocell is configured to handle an NRZI (Non Return to Zero Invert) data transfer of K and J states, and said full-speed and/or low-speed test functions comprise a test function forcing said USB transceiver macrocell to repetitively transmit a full-speed or low-speed test pattern until an exit action is taken; and
   wherein said full-speed or low-speed test pattern is a concatenation of four KJ state pairs, two single-ended-zero signals, and two J states.

2. A southbridge device having USB (Universal Serial Bus) functionality, comprising:
   a USB enhanced host controller adapted to control a high-speed data traffic;
   a USB transceiver macrocell connected to said USB enhanced host controller to handle the data transfer to and from a USB device; and
   a transceiver test circuit for controlling said USB transceiver macrocell to perform full-speed and/or low-speed test functions;
   wherein said USB enhanced host controller has a register file comprising registers storing data with respect to at least one of said full-speed and/or low-speed test functions;
   wherein at least one of said registers is a status register adapted to store data indicating a status when said USB transceiver macrocell is controlled to perform one of said full-speed and/or low-speed test functions;
   wherein said USB transceiver macrocell is configure to handle an NRZI (Non Return to Zero Invert) data transfer of K and J states, and said full-speed and/or low-speed test functions comprise a test function forcing said USB transceiver macrocell to repetitively transmit a full-speed or low-speed test pattern until an exit action is taken; and
   wherein said full-speed or low-speed test pattern is a concatenation of four KJ state pairs, two single-ended-zero signals, and two J states.

3. A host controller for controlling the transfer of data to and from peripheral devices over a serial bus, the host controller comprising:
   a first control circuit adapted to control a data transfer at a first data transmission speed;
   a second control circuit adapted to control a data transfer at a second data transmission speed lower than said first data transmission speed; and
   a transceiver circuit connected to said first control circuit to handle the data transfer to and from said peripheral devices at said first and second data transmission speeds;
   wherein said first control circuit comprises a test circuit for controlling said transceiver circuit to perform test functions to test the operation of said transceiver circuit at said second data transmission speed;
   wherein said transceiver circuit is configure to handle an NRZI (Non Return to Zero Invert) data transfer of K and J states, and said test functions comprise a test function adapted to force said transceiver circuit to repetitively transmit a second-speed test pattern until an exit action is taken; and wherein said second-speed test pattern is a concatenation of four KJ state pairs, two single-ended-zero signals, and two J states.

4. The host controller of claim 3, wherein said transceiver circuit is capable of handling an NRZI (Non Return to Zero Invert) data transfer of K and J states, and said test functions comprise at least one of a test-J function forcing said transceiver circuit to enter the J state and remain in that state until an exit action is taken, and a test-K function forcing said transceiver circuit to enter the K state and remain in that state until an exit action is taken.

5. The host controller of claim 3, wherein said transceiver circuit is capable of handling an NRZI (Non Return to Zero Invert) data transfer, and said test functions comprise a single-ended-zero test function forcing said transceiver circuit to enter a second-speed receive mode and remain in that mode until an exit action is taken.

6. A method of operating a USB (Universal Serial Bus) host controller, the method comprising:
   operating an enhanced host controller to control a USB high-speed data traffic;
   operating at least one companion host controller to control a USB full-speed and/or low-speed data traffic; and
   handling the data transfer to and from a USB device in a USB transceiver macrocell;
   wherein the method further comprises:
   operating a test circuit in said enhanced host controller to control said USB transceiver macrocell to perform full-speed and/or low-speed test functions;
   storing data with respect to at least one of said full-speed and/or low-speed test functions in a register file of said enhanced host controller, wherein said data comprises control data indicating one of said full-speed and/or low-speed test functions, and wherein said control data comprises a flag indicating whether said one of said full-speed and/or low-speed test functions is currently being performed;
   wherein handling the data transfer to and from said USB device comprises handling an NRZI (Non Return to Zero Invert) data transfer of K and J states, and said full-speed and/or low-speed test functions comprise a test function forcing said USB transceiver macrocell to repetitively transmit a full-speed or low-speed test pattern until an exit action is taken; and
   wherein said full-speed or low-speed test pattern is a concatenation of four KJ state pairs, two single-ended-zero signals, and two J states.

7. A USB (Universal Serial Bus) host controller comprising:
   an enhanced host controller adapted to control a USB high-speed data traffic;
   at least one companion host controller adapted to control a USB full-speed and/or low-speed data traffic; and
   a USB transceiver macrocell connected to said enhanced host controller to handle the data transfer to and from a USB device;
   wherein said enhanced host controller comprises a test circuit for controlling said USB transceiver macrocell to perform full-speed and/or low-speed test functions;
   wherein said USB transceiver macrocell is configure to handle an NRZI (Non Return to Zero Invert) data transfer of K and J states, and said full-speed and/or low-speed test functions comprise a test function forcing said USB transceiver macrocell to repetitively transmit a full-speed or low-speed test pattern until an exit action is taken; and
   wherein said full-speed or low-speed test pattern is a concatenation of four KJ state pairs, two single-ended-zero signals, and two J states.

8. A southbridge device having USB (Universal Serial Bus) functionality, comprising:
   a USB enhanced host controller adapted to control a high-speed data traffic;
   a USB transceiver macrocell connected to said USB enhanced host controller to handle the data transfer to and from a USB device; and
   a transceiver test circuit for controlling said USB transceiver macrocell to perform full-speed and/or low-speed test functions;
   wherein said USB transceiver macrocell is configure to handle an NRZI (Non Return to Zero Invert) data transfer of K and J states, and said full-speed and/or low-speed test functions comprise a test function adapted to force said USB transceiver macrocell to repetitively transmit a full-speed or low-speed test pattern until an exit action is taken; and
   wherein said full-speed or low-speed test pattern is a concatenation of four KJ state pairs, two single-ended-zero signals, and two J states.

9. A method of operating a USB (Universal Serial Bus) host controller, the method comprising:
   operating an enhanced host controller to control a USB high-speed data traffic;
   operating at least one companion host controller to control a USB full-speed and/or low-speed data traffic; and
   handling the data transfer to and from a USB device in a USB transceiver macrocell;
   wherein the method further comprises:
   operating a test circuit in said enhanced host controller to control said USB transceiver macrocell to perform full-speed and/or low-speed test functions
   wherein handling the data transfer to and from said USB device comprises handling an NRZI (Non Return to Zero Invert) data transfer of K and J states, and said full-speed and/or low-speed test functions comprise a test function forcing said USB transceiver macrocell to repetitively transmit a full-speed or low-speed test pattern until an exit action is taken, wherein said full-speed or low-speed test pattern is a concatenation of four KJ state pairs, two single-ended-zero signals, and two J states.

\* \* \* \* \*